United States Patent Office 3,065,193
Patented Nov. 20, 1962

3,065,193
AQUEOUS SOLUTIONS OF POLYACRYLAMIDE STABILIZED WITH WATER SOLUBLE NITRITE
Henry Volk, Bay City, Mich., assignor to The Dow Chemical Company, Midland, Mich., a corporation of Delaware
No Drawing. Filed Feb. 27, 1961, Ser. No. 91,617
7 Claims. (Cl. 260—29.6)

The present invention relates to acrylamide polymers. More particularly, the invention concerns stabilized acrylamide polymer compositions.

It has been observed that the activity of water-soluble acrylamide polymers, when employed, for example, as flocculents in an aqueous medium, is often significantly reduced within a few hours after dissolving the polymer. This result is believed to be caused by some kind of degradation or molecular weight breakdown in the dissolved polymer.

While the exact mechanism by which such degradation occurs is not known, it is believed to be promoted by one or more agents such as oxygen and metal ions capable of existing in two valence states such as, for example, iron and copper and the like. Generally suspect are materials which are capable of forming or contributing to the formation of a redox system. Such agents may be contained in the polymer or water as impurities or deliberately incorporated therein for other purposes. Exemplary of the latter instance are the teachings in United States Patent 2,960,486 wherein sulfites are added to acrylamide polymers to reduce residual acrylamide monomer. The sulfites also prevent degradation of the polymer solution in the absence of air or oxygen. However, when exposed to an oxidizing agent, these sulfites have a pronounced propensity to induce degradation of the dissolved acrylamide polymer. Chain degradation or molecular weight breakdown in acrylamide polymers is evidenced by decreases in the viscosity of aqueous solutions of the polymer.

Correspondingly, it is an object of the present invention to provide means for eliminating or at least substantially reducing degradation of acrylamide polymers. A particular object is to provide an acrylamide polymer composition especially resistant to molecular weight breakdown in aqueous solutions as evidenced by losses in solution viscosity. Other objects and benefits will become apparent hereinafter as the invention is more fully described.

In accordance with the invention, water-soluble acrylamide polymers are stabilized or at least characterized by increased resistance to degradation by the presence of a small but effective quantity of a water-soluble salt of nitrous acid. In an aqueous solution from about 0.1 to about 8 weight percent of the nitrite salt is effective. What is more, an even greater improvement in the stability of the dissolved acrylamide polymer is achieved if conjunctively with the salt of nitrous acid from about 0.1 to about 2 weight percent of a water-soluble salt of hydriodic acid is also incorporated into the aqueous polymer solution. The foregoing weight percentages are based on the weight of the polymer in solution. Preferably, the amounts of the nitrite and iodide salts employed are within the ranges from about 1.0 to about 5.0 weight percent and from about 0.5 to about 1.0 weight percent, respectively.

Examples of nitrite salts that can be employed include sodium nitrite, potassium nitrite, lithium nitrite, magnesium nitrite, calcium nitrite, barium nitrite, ammonium nitrite and the like. Examples of iodide salts are the corresponding metal and ammonium iodides. While the stabilizing agent employed is preferably a salt, nitrous and hydriodic acids can be added directly to an aqueous polymer solution. In such an instance, the pH of the resulting solution is adjusted to a level above about pH 3 and preferably not to exceed a pH of about 9 or 10, with a suitable base whereby the salt of the acid is formed in situ.

The term "acrylamide polymer" as employed in the present specification and claims refers to the homopolymers of acrylamide and water-soluble copolymers of acrylamide with other suitable monoethylenic monomers copolymerizable therewith. These acrylamide polymers are water-soluble, vinyl-type polymers characterized by substantial linearity, i.e., having little or no cross-linking between polymer chains. When the comonomer polymerized with the acrylamide contains water-solubilizing groups, as, for example, in copolymers of acrylamide with acrylic acid, methacrylic acid, maleic acid, methacrylamide, vinylbenzylammonium compounds (such as trimethylvinylbenzylammonium chloride), vinylbenzene sulfonic acid, N-vinyloxazolidinone, N-vinylpyrrolidinone, N-vinylmorpholinone and the like, the copolymer may contain up to about 50 mole percent of units derived from such comonomers. However, with comonomers containing no such hydrophilic groups, such as, for example, ethylene, butylene, styrene, alkyl esters of acrylic and methacrylic acid, vinylchloride, vinylidene chloride and the like, it is generally desirable that the copolymer contain no more than about 25 mole percent of the units derived from said comonomer.

In carrying out the invention, the nitrite or nitrite-iodide additives of the invention are incorporated into solutions of the acrylamide polymers in any convenient manner.

One procedure involves first uniformly blending sufficient quantities of additives with the acrylamide polymer to inhibit degradation in the polymer when dissolved and then utilizing the resulting composition to prepare stable aqueous solutions.

In another procedure, the stabilizing components and the acrylamide polymer are added separately to a common aqueous medium. If the polymer is dissolved first, it is desirable to utilize efficient mixing devices such as mixing mills, pumps suitably designed or enclosed augers to accomplish a complete and uniform mixing of the additives throughout the polymer solution.

In a preferred mode of operation, an aqueous solution containing suitable amounts of a nitrite salt or nitrite and iodide salt mixture is mixed with an aqueous solution of the acrylamide polymer in relative proportions so as to provide the ultimately desired concentration of the stabilizing components in the aqueous polymer solution.

Aqueous acrylamide polymer solutions treated in accordance with the invention exhibit smaller decreases in viscosity in the presence of oxygen, ferric ions and the like degradative agents, over wide ranges in pH. The viscosity stability is directly correlated with a reduced propensity of the acrylamide polymer solute to undergo molecular weight breakdown.

The following examples are illustrative of the present invention. The testing procedure employed involves subjecting acrylamide polymer solutions to conditions conducive to relatively severe degradation as compared to normal storage conditions of the polymer solutions.

EXAMPLE 1

To 100 milliliters of an aqueous solution containing 0.15 percent by weight of sodium chloride was added 0.3 gram of a water-soluble polymer composition consisting essentially of a homopolymer of acrylamide having about 5 percent of the amide groups hydrolyzed to carboxyl groups, a small amount of potassium hydroxide (0.5 percent by weight based on the polymer) and a trace amount of residual sodium sulfite. The sodium sulfite had been introduced into the polymer composition in an amount of about 3.5 percent by weight based on the polymer to reduce any free monomer present. The above-prepared composition is hereinafter designated solution "A."

To a second acrylamide polymer solution, hereinafter designated solution "B," prepared identically to that above, was added 5.0 percent sodium nitrite based on the weight of the polymer.

Both solutions thus prepared were placed in open bottles and heated at 90° C. in the presence of oxygen for 6 days.

Absolute viscosities were determined for each polymer solution at 30° C. before and after heating by means of an Ostwald viscosimeter. The results of these measurements and the percent retained viscosity are reported in the following Table 1. The initial polymer solution viscosity before heating is designated as $N_0$ and that 6 days subsequent to heating is designated at $N_6$.

Table 1

| Polymer Solution | $N_0$ | $N_6$ | Percent Retained Viscosity ($N_6/N_0 \times 100$) |
|---|---|---|---|
| "A" | 5.59 | 3.75 | 67 |
| "B" | 5.7 | 5.85 | 100 |

EXAMPLE 2

A homopolymer of acrylamide similar to that employed above, which likewise had been treated with 3.5 percent sodium sulfite, was dissolved in water containing one part per million of ferric ions. Enough of the polymer was dissolved to provide 0.5 weight percent of the polymer in solution. To different portions of this solution were added (1) 0.6 percent sodium nitrite and (2) 0.5 percent potassium iodide and 0.6 percent sodium nitrite, the percentages being based on the weight of polymer in solution. Another portion of the original polymer solution was utilized as a control without further additions.

Initial absolute viscosities were determined for each of the above solutions as an adjusted pH of about 3 and at a temperature of about 25° C. by means of an Ostwald viscosimeter. Subsequently, aliquots of each solution were adjusted to pH levels specified in the following Table 2 and allowed to stand at room temperature for about 14 days. At the end of the test period, the individual aliquots were again adjusted to a pH of 3 and their viscosities determined in accordance with the procedure described above. The numerical results reported in the following Table 2 indicate absolute viscosity values in centipoises.

Table 2

| | Treatment Classification | | |
|---|---|---|---|
| | Control | 0.5 Percent $NaNO_2$ | 0.5 Percent $KI$+0.6 Percent $NaNO_2$ |
| Initial Soln. Vis., cps | 19.8 | 21.0 | 19.3 |
| Solution pH During Storage: | | | |
| 3 ___cps__ | 13.8 | 18.1 | 19.2 |
| 5 ___cps__ | 9.1 | 19.9 | 19.8 |
| 7 ___cps__ | 9.9 | 16.4 | 18.8 |

In a manner similar to that of the foregoing examples, copolymers of acrylamide with one or more monomers such as methacrylamide, vinylbenzylammonium compounds, vinylbenzene sulfonic acid, N-vinylpyrrolidinone, N-vinylmorpholinone, ethylene, butylene, styrene, ethyl acrylate, methyl methacrylate, vinyl chloride or vinylidene chloride are dissolved in water in the presence of a small but effective quantity of a nitrite such as an alkali metal nitrite, alkaline earth nitrite of ammonioum nitrite, or if more improvement is desired such a nitrite conjunctively with a small but effective quantity of an iodide such as an alkali metal iodide, alkaline earth metal iodide or ammonium iodide, to achieve a comparable enhancement in the resistance of acrylamide polymers to degradation.

What is claimed is:

1. A composition of matter comprising an aqueous solution of an acrylamide polymer having dissolved therein from about 0.1 to about 8 weight percent of a water-soluble nitrite based on the weight of the polymer.

2. A composition of matter as in claim 1 wherein the nitrite is selected from the group consisting of alkali metal nitrites, alkaline earth metal nitrites and ammonium nitrite.

3. A composition of matter comprising an aqueous solution of an acrylamide polymer having incorporated therein sufficient quantities of a nitrite and an iodide to inhibit the degradation of the dissolved polymer.

4. A composition of matter as in claim 3 wherein the amount of the nitrite employed is from about 0.1 percent to about 8 percent and the amount of iodide employed is from about 0.1 percent to about 2 percent by weight of the polymer.

5. A composition as in claim 3 wherein the nitrite is selected from the group consisting of alkali metal nitrites, alkaline earth metal nitrites and ammonium nitrite, and the iodide is selected from the group consisting of alkali metal iodides, alkaline earth metal iodides and ammonium iodide.

6. A composition as in claim 3 wherein the acrylamide polymer is polyacrylamide.

7. A method for enhancing the stability of acrylamide polymers in aqueous solutions which comprises the step of incorporating into the solution sufficient quantities of a nitrite and an iodide to inhibit degradation of the dissolved polymer.

References Cited in the file of this patent
UNITED STATES PATENTS
2,879,257     Walter et al. _____ Mar. 24, 1959